May 23, 1950  R. C. HENSHAW  2,509,145
JOINT
Filed Nov. 28, 1944

Inventor
Richard C Henshaw
By Ralph Hammar
Attorney

Patented May 23, 1950

2,509,145

UNITED STATES PATENT OFFICE 2,509,145

JOINT

Richard C. Henshaw, Erie, Pa., assignor to Lord Manufacturing Company, Erie, Pa., a corporation of Pennsylvania Application November 28, 1944, Serial No. 565,465

3 Claims. (Cl. 287—85)

In joints having inner and outer parts connected by bonding to an intermediate rubber member and subjected to alternate tension and compression by relative movement of the parts of the joint along a path transverse to the axis of the joint, the bond tends to break in the tension side of the joint and once broken, will progressively peel under loads well under the ultimate unbroken bond strength. The present invention is designed to limit the progressive bond failure by interrupting or dividing the bond surface into sections. Further objects and advantages appear in the specification and claims.

Figure 1:
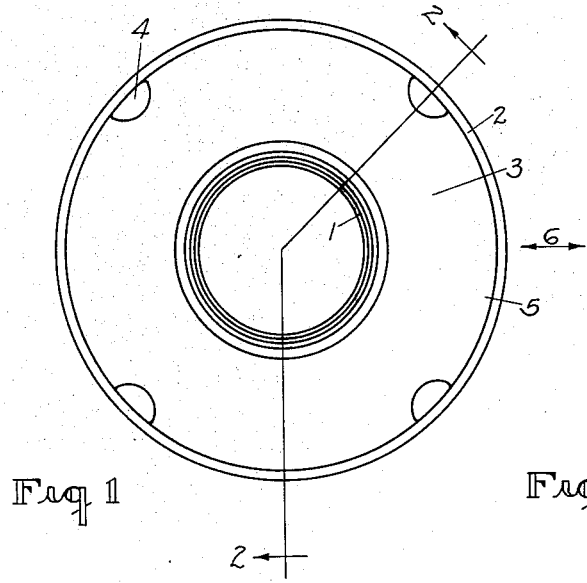
Figure 2:
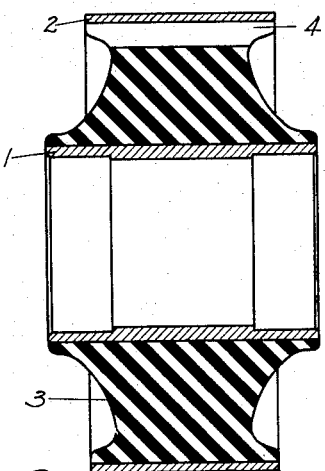
Figure 3:
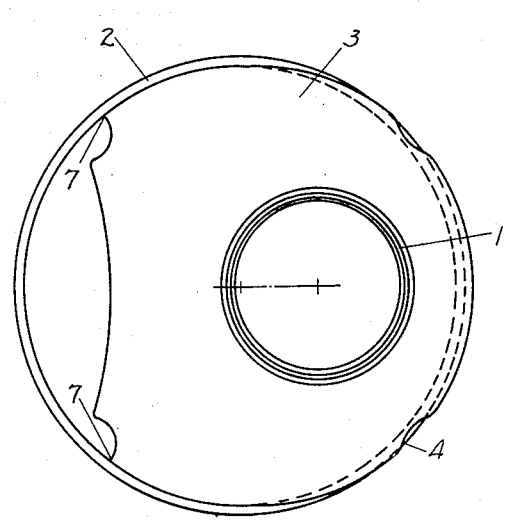

In the accompanying drawing, Fig. 1 is a side elevation of a joint embodying my invention; Fig. 2 is a sectional view on line 2—2 of Fig. 1; Fig. 3 is a diagrammatic view illustrating the operation under conditions of partial bond failure; and Fig. 4 is a fragmentary view of a radial engine mounting using the joints.

Referring to the drawing, there is shown a joint having inner and outer members 1 and 2 consisting of a hollow center pin and an outer ring. The joint members are respectively attached to supporting and supported members. Between the joint members is a rubber ring 3 having its inner surface bonded to the center pin and its outer surface bonded to the outer member. The outer surface of the rubber ring is provided with a plurality of axially extending grooves 4 which divide the outer surface of the ring into sections 5, two of which are centered on each side of the axis of relative movement of the joint members under maximum load transverse to the axis of the joint. The direction of the relative movement under such load is indicated by an arrow 6.

Although the axial width of the rubber ring is increased at the bond surfaces, there is a tendency for the bond to break at the outer surface of the rubber ring at some point in the sections 5 centered on the axis of maximum relative movement. The point of initial bond failure is not precisely determinable and usually occurs only under overload conditions. However, once the bond has been broken, it will progressively peel under vibrating load which would be insufficient to cause the initial bond failure. Apparently the bond failure results in ragged edges which cause localized points of stress concentration in excess of the bond strength. When the peeling of the bond has reached the limits of the sections centered on the axis of vibrating movement, further peeling of the bond is prevented by the smooth unbroken bond surfaces provided by the edges of the grooves 4. The behavior of the joint under this condition is illustrated in Fig. 3 where the inner and outer joint members are shown in one extreme position of maximum load. From this position it can be seen that the tension stress at the unbroken edges 7 of the bond is further decreased by the fact that the maximum tension stress does not act directly on the bond edges. If the unbroken bond edges 7 were not provided, the stress on the bond would be sufficient to cause peeling of the bond throughout the entire outer surface of the rubber ring. By decreasing the bond area on the outer surface of the rubber ring through the grooves 4, the possibility of complete bond failure is decreased.

Figure 4:
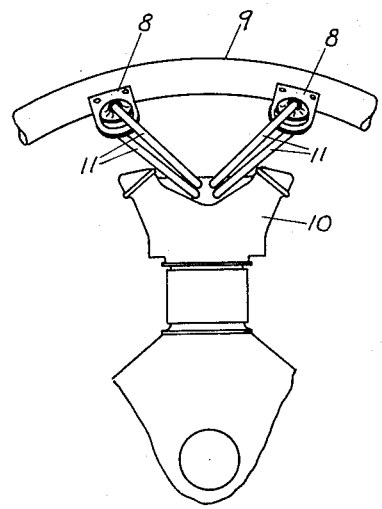

In Fig. 4 is shown a fragmentary view illustrating the application of the joint to a radial engine mounting. The joints are used in pairs, the outer joint members being received in brackets 8 attached to the engine mouting ring 9 on opposite sides of one of the engine cylinders 10. The inner joint members 1 are attached by struts 11 which converge toward and are attached to the engine cylinder. The joints are located in the brackets 8 so that the engine thrust, especially at take-off or pulling out of a dive, causes a transverse relative movement of the joint members 1 and 2 along a path through the centers of bond sections 5. This type of engine mounting is well understood so that further description is not required.

What I claim as new is:

1. In a joint, an annulus of rubber having axially extending grooves in the rubber dividing the outer peripheral surface into sections, attaching means at the center of the annulus, and a tubular member bonded by surface union to the sections and spaced from the grooves.

2. In a joint, inner and outer joint members, having opposed cylindrical surfaces, a rubber member having inner and outer surfaces presented to the respective joint members, and having grooves in the rubber member dividing the outer surface into sections, the inner surface and the sections being bonded by surface union to the respective joint members.

3. In a mounting, a rubber ring having axially extending inner and outer surfaces, supporting and supported members relatively movable in a path transverse to the axis of the ring, said ring having axially extending grooves on opposite sides of the path of relative movement dividing the outer surface into sections, and cylindrical surfaces on the members respectively bonded by surface union to the inner surface and to the sections of the outer surface.

RICHARD C. HENSHAW.

REFERENCES CITED

The following references are of record in the file of this patent:

UNITED STATES PATENTS

| Number | Name | Date |
|---|---|---|
| 1,555,214 | Johnson | Sept. 25, 1925 |
| 1,786,717 | Moore et al. | Dec. 30, 1930 |
| 1,824,090 | Lord | Sept. 22, 1931 |
| 2,256,752 | Saurer | Sept. 23, 1941 |
| 2,322,193 | Kaemmerling | June 15, 1943 |
| 2,357,740 | Hickin et al. | Sept. 5, 1944 |

FOREIGN PATENTS

| Number | Country | Date |
|---|---|---|
| 680,434 | France | Jan. 18, 1930 |
| 396,377 | Great Britain | July 31, 1933 |